United States Patent
Conete et al.

(10) Patent No.: US 7,677,026 B2
(45) Date of Patent: Mar. 16, 2010

(54) MIXER FOR SEPARATE-FLOW NOZZLE

(75) Inventors: Eric Conete, Merignac (FR); Eric Philippe, Merignac (FR); Laurent Baroumes, Bordeaux (FR)

(73) Assignee: Snecma Propulsion Solide, Le Haillan (FR)

( * ) Notice: Subject to any disclaimer, the term of this patent is extended or adjusted under 35 U.S.C. 154(b) by 277 days.

(21) Appl. No.: 11/664,043

(22) PCT Filed: Sep. 28, 2005

(86) PCT No.: PCT/FR2005/050790

§ 371 (c)(1),
(2), (4) Date: Mar. 28, 2007

(87) PCT Pub. No.: WO2006/035186

PCT Pub. Date: Apr. 6, 2006

(65) Prior Publication Data

US 2008/0115484 A1   May 22, 2008

(30) Foreign Application Priority Data

Sep. 29, 2004   (FR) ................... 04 10296

(51) Int. Cl.
*F02K 1/48* (2006.01)
(52) U.S. Cl. .............................. 60/262; 60/264; 60/770; 239/265.17; 181/220
(58) Field of Classification Search ................ 60/226.1, 60/262, 264, 770; 239/265.17, 265.19; 181/213, 181/220

See application file for complete search history.

(56) References Cited

U.S. PATENT DOCUMENTS

| 4,335,801 A | * | 6/1982 | Stachowiak et al. | ......... 181/220 |
| 4,449,607 A | * | 5/1984 | Forestier et al. | ............. 181/213 |
| 4,813,230 A | * | 3/1989 | Braithwaite | .................. 60/262 |
| 4,907,743 A | | 3/1990 | Bouiller et al. | |
| 5,265,807 A | * | 11/1993 | Steckbeck et al. | ...... 239/265.11 |
| 5,755,092 A | | 5/1998 | Dessale et al. | |
| 5,924,632 A | | 7/1999 | Seiner et al. | |
| 6,012,281 A | | 1/2000 | Hauser | |
| 6,412,283 B1 | | 7/2002 | Sheoran et al. | |
| 6,606,854 B1 | | 8/2003 | Siefker et al. | |
| 6,648,597 B1 | * | 11/2003 | Widrig et al. | ................ 415/200 |
| 6,773,215 B2 | * | 8/2004 | Cuva et al. | ................... 411/553 |

FOREIGN PATENT DOCUMENTS

| EP | 1141534 | 10/2001 |
| FR | 2 597 157 | 10/1987 |

* cited by examiner

*Primary Examiner*—Ted Kim
(74) *Attorney, Agent, or Firm*—Weingarten, Schurgin, Gagnebin & Lebovici LLP

(57) ABSTRACT

A mixer for a separate-stream turbojet nozzle, the mixer comprising along a longitudinal axis (X-X') both a fastener shroud (10) for connecting said mixer to the exhaust casing of the nozzle, and a lobe structure (20) presenting a succession of inner and outer lobes (22 and 21) distributed circumferentially around the longitudinal axis (X-X') of the mixer. The lobe structure (20) is made of a ceramic matrix composite material and further comprises a stiffener ring (30) that forms a connection between at least some of the lobes of said structure. Thus, the major portion of the mixer, i.e. the lobe structure, is made of a ceramic matrix composite material, thereby significantly reducing the weight of the mixer, and consequently reducing the weight of the nozzle.

14 Claims, 4 Drawing Sheets

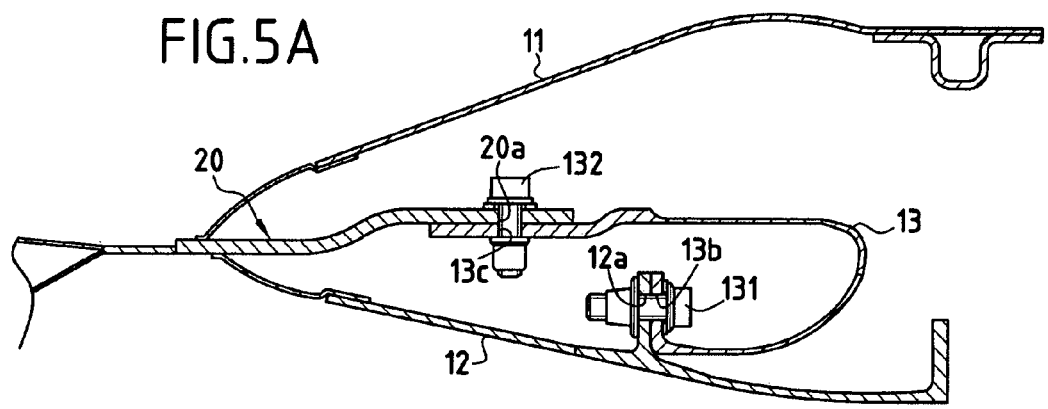
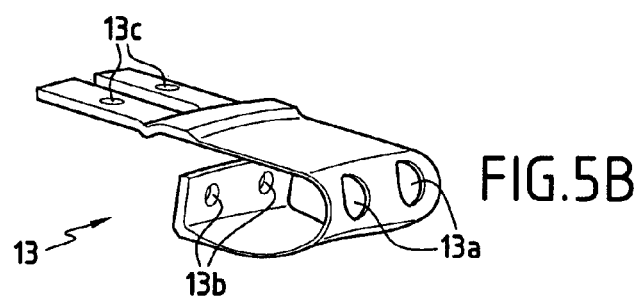
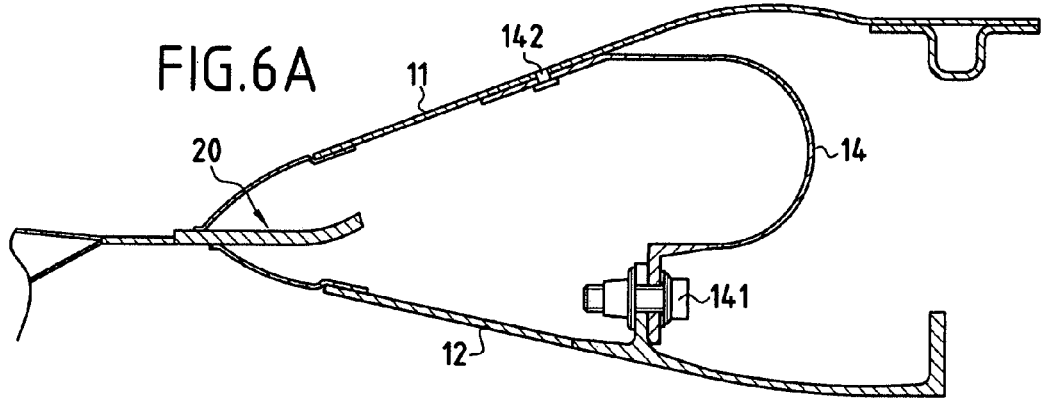
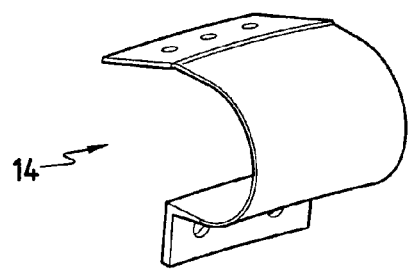

MIXER FOR SEPARATE-FLOW NOZZLE

This application is a §371 national phase filing of PCT/FR2005/050790 filed Sep. 28, 2005, and claims priority to French application No. 04 10296 filed Sep. 29, 2004.

BACKGROUND OF THE INVENTION

The present invention relates to the general field of nozzles fitted to airplane turbojets. It relates more particularly to separate-stream nozzles fitted with stream mixers that serve to reduce the noise emitted by the jet leaving the nozzle, while also improving the performance of the engine.

More precisely, the separate-stream nozzles of turbojets are generally constituted by a confluent flow nacelle containing a primary cover defining a first annular channel for the flow of a primary stream (or hot stream) coming from the combustion chamber, and a secondary cover disposed concentrically around the primary cover so as to define a second annular channel for the flow of a secondary stream (or cold stream) coming from the fan.

In order to reduce the noise of the jet generated at the outlet from such a nozzle, it is known to use mixers having a special design for encouraging mixing between the primary and secondary streams coming from the turbojet. One of the designs in widespread use at present in civilian turbojets comprises the lobe mixer. The lobe mixer serves to obtain radial shear between the primary and secondary streams, thereby encouraging mixing between those streams. Embodiments of lobe mixers for separate-stream nozzles are described in particular in the following documents: EP 1 141 534; U.S. Pat. No. 5,755,092; and U.S. Pat. No. 5,924,632.

Nevertheless, although a mixer of that type serves to improve the efficiency and the sound performance of turbojets having separate-stream nozzles, it inevitably increases the weight of the nozzle, thereby impacting the dynamics of the engine as a whole and of its connection with the wiring pylon. A lobe mixer is traditionally made of a metal, typically of Inconel® 625. Consequently, it represents a non-negligible extra weight cantilevered out from the engine, leading to an increase in the mechanical load on the flange of the nozzle exhaust casing, in particular in the event of extreme or limiting loads as occur with the loss of a blade or in response to unbalance. This additional weight also generates an increase in the forces at the engine-to-pylon interfaces.

OBJECT AND SUMMARY OF THE INVENTION

An object of the present invention is to propose a novel design of lobe mixer for a separate-stream nozzle that serves to reduce the mechanical loads generated by the presence of such a weight at the outlet of the nozzle.

In accordance with the invention, this object is achieved by the facts that the mixer is made of two portions, namely a fastener shroud for connecting the mixer to the exhaust casing of the nozzle, and a lobe structure for mixing the streams coming from the turbojet, and that the lobe structure is made of a ceramic matrix composite material and includes means for making connections between at least some of the lobes of the structure.

Thus, the major portion of the mixer of the invention, i.e. the lobe structure, is made of a ceramic matrix composite material, thereby significantly reducing the weight of the mixer, and consequently reducing the weight of the nozzle by about 30% to about 50%.

In addition, since the lobe structure is made of a thermostructural composite material, it possesses good mechanical properties that it conserves at high temperature.

The connections made between the lobes serve to stiffen, and consequently to reinforce, the lobe structure as a whole, thereby giving it mechanical behavior that is at least as good as that of mixers made entirely of metal.

The term "ceramic matrix composite" (CMC) material is used to designate a material made of reinforcement of refractory fibers (carbon fibers or ceramic fibers) densified by a matrix that is ceramic, at least in part. CMC materials are in particular: C/SiC composites (carbon fiber reinforcement and silicon carbide matrix); C/C—SiC composites (carbon fiber reinforcement and matrix comprising both a carbon phase, generally closer to the fibers, and a silicon carbide phase); SiC/SiC composites (both reinforcing fibers and matrix of silicon carbide); and oxide/oxide composites.

The lobe structure may be made as a single piece, or it may be built up from a plurality of assembled-together sectors, thus making it possible in some circumstances to facilitate fabrication of the lobe structure and to reduce replacement costs.

In an aspect of the invention, the lobe structure includes a stiffener ring that is fastened to the inner lobes thereof in the vicinity of their ends. This ring may be made of a metal material or of a ceramic matrix composite material. It may be fastened to the inner lobes by bolted connections, the ring then having streamlining means for integrating each connection so as to limit aerodynamic losses and ensure that the ring withstands buckling loads.

In order to compensate the differential expansion between the metal fastener shroud of the mixer and the lobe structure made of ceramic matrix composite material, flexible fastener tabs are used for attaching the lobe structure to the fastener shroud.

Similarly, the outer cover, that receives mainly a bypass stream at temperatures lower than those received by the inner shroud, that receives mainly the stream of hot gases from the combustion chamber of the turbojet, may be fastened to the inner shroud by flexible fastener tabs so as to compensate for differential expansion between those two parts.

The present invention also provides a turbojet in which the separate-stream nozzle includes a mixer as defined above.

BRIEF DESCRIPTION OF THE DRAWINGS

Other characteristics and advantages of the invention appear from the following description of particular embodiments of invention, given as non-limiting examples, with reference to the accompanying drawings, in which:

FIG. 5A is a section view on section plane A of FIG. 4;

FIG. 5B is a perspective view of a fixing tab of FIG. 5A;

FIG. 6A is a section view on section plane B of FIG. 4;

FIG. 6B is a perspective view of a fixing tab of FIG. 6A;

DETAILED DESCRIPTION OF AN EMBODIMENT

Figure 1:
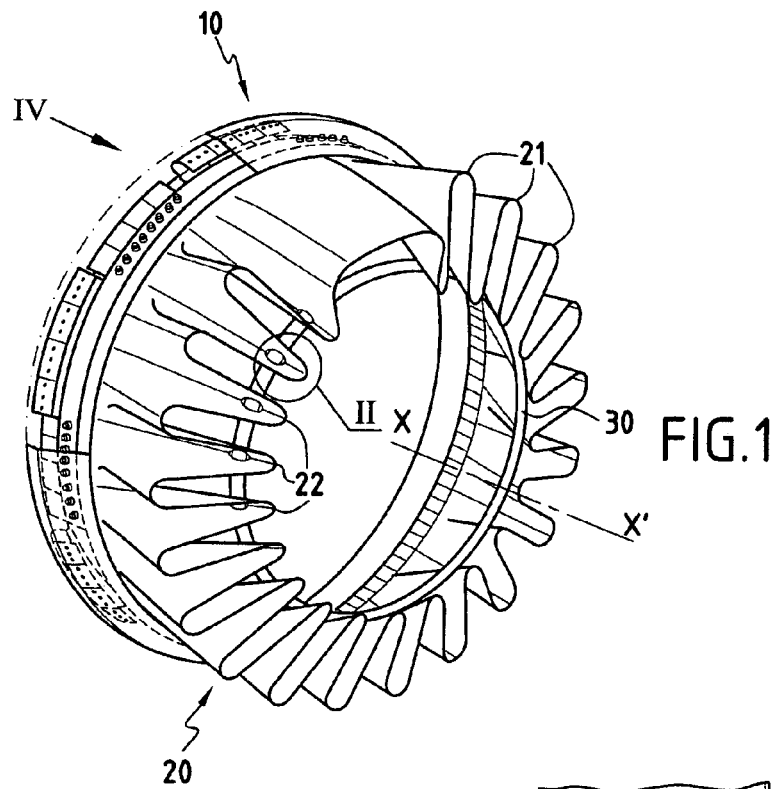
FIG. 1 is a perspective view of a mixer for the nozzle of a turbojet in one embodiment of the invention.

FIG. 1 shows a mixer for a separate-stream turbomachine nozzle constituting an embodiment of the invention. The mixer, which extends along a longitudinal axis X-X', comprises firstly a fastener shroud 10 made of metal (e.g. Inconel® 625) for connecting the mixer to the exhaust casing of a turbojet nozzle (not shown), and secondly a lobe structure 20 at the end of which mixing takes place between the inner gas stream from the combustion chamber of the turbojet (also referred to as the hot stream or the primary stream) flowing inside of the mixer, and the outer stream, e.g. coming from the upstream fan (also referred to as the cold stream or the secondary stream) flowing outside the mixer.

In order to limit the noise generated at the confluence of the two streams leaving the mixer, the structure 100 presents a series of undulations forming a plurality of outer and inner lobes 21 and 22 distributed circumferentially around the longitudinal axis X-X' of the mixer. In well known manner, the use of such a lobe structure in a nozzle having a primary stream and secondary stream mixer serves to control the mixing between the two streams in such a manner as to improve the performance of the turbojet and reduce the noise emitted thereby.

In accordance with the present invention, the lobe structure 20, which has traditionally been made of metal, typically Inconel® 625, is now made of a ceramic matrix composite material (CMC), i.e. a material made of refractory reinforcing fibers (of carbon or ceramic) densified by a matrix that is constituted at least in part by ceramic.

In order to fabricate the lobe structure of the present invention, a fiber preform of refractory fibers (of carbon or ceramic) is made having substantially the shape of the lobes structure to be made. The preform is then densified, in well known manner, using a liquid and/or a gaseous technique.

Liquid densification consists in impregnating the preform with a liquid composition containing a precursor for the material of the matrix. The precursor is usually in the form of a polymer, such as a resin, possibly diluted in a solvent. The precursor is transformed into ceramic by heat treatment, after eliminating any solvent and cross linking the polymer. A plurality of successive impregnation cycles may be performed in order to achieve the desired degree of densification. By way of example, liquid precursors of carbon may be resins having a relatively high coke content, such as phenolic resins, whereas liquid precursors of ceramic, in particular of SiC, may be resins of the polycarbosilane (PCS) or of the polytitanocarbosilane (PTCS) type.

The gaseous technique consists in chemical vapor infiltration. The fiber preform corresponding to the structure to be made is placed in an oven into which a reaction gas is admitted. The pressure and the temperature within the oven, and the composition of the gas are selected in such a manner as to enable the gas to diffuse within the pores of the preform in order to form the matrix by depositing a solid material in contact with the fibers as a result of a component of the gas decomposing or as a result of a reaction between a plurality of components. By way of example, gaseous precursors of carbon may be hydrocarbons such as methane and/or propane giving carbon by cracking, and the gaseous precursor of ceramic, in particular SiC, may be methyltrichlorosilane (MTS) giving SiC by decomposition of the MTS.

There are also exist combined methods making use both of liquid and of gaseous techniques.

The lobe structure of the invention may be made of the following ceramic matrix composite materials (CMC): C/SiC composite (carbon fiber reinforcement and silicon carbide matrix); C/C—SiC composite (carbon fiber reinforcement and a matrix comprising both a carbon phase, generally closer to the fibers, and a silicon carbide phase); SiC/SiC composite (reinforcing fibers and matrix both of silicon carbide); and oxide/oxide composite.

The structure of the invention may be formed directly as a single piece. However the lobe structure may also be made up of a plurality of sectors that are assembled together, which can be advantageous in certain circumstances, in particular because of the complex shape of the structure to be made.

Figure 7A:
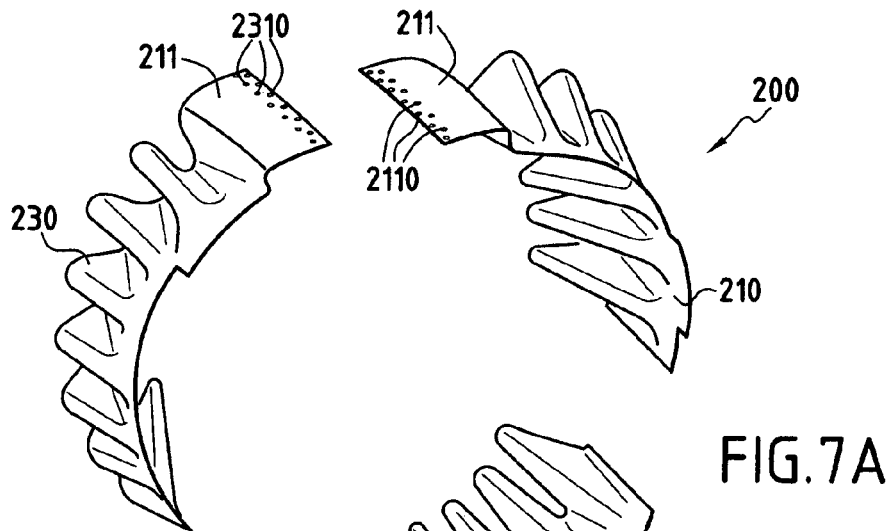
FIG. 7A is a perspective view of a plurality of sectors used for forming a lobe structure in accordance with another embodiment of the invention.
Figure 7B:
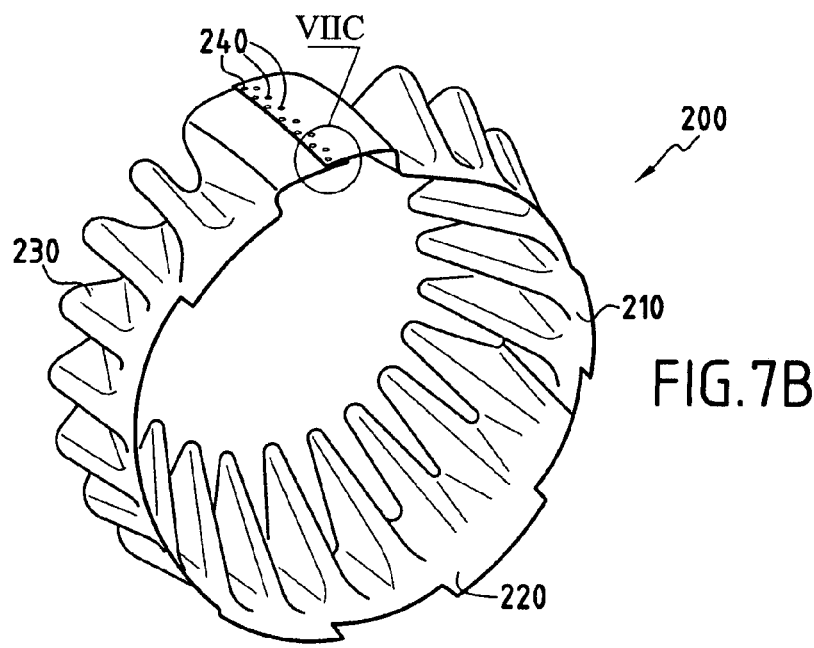
FIG. 7B is a perspective view of a lobe structure obtained after assembling the sectors of FIG. 7A.
Figure 7C:
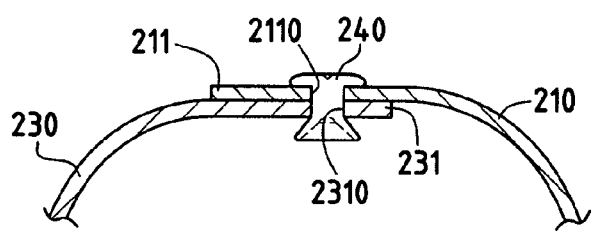
FIG. 7C is an enlarged section view looking along VIIC of FIG. 7B.

An embodiment of a lobe structure in sectors is shown in FIGS. 7A to 7C. As shown in FIG. 7A, a lobe structure 200 is made by assembling together three sectors 210, 220, 230 made of a ceramic matrix composite material using the fabrication methods described above. Each sector is made separately (i.e. the fiber preform and densification), thus providing greater flexibility in fabrication and also in maintenance. During fabrication, it is possible to define a size of sector that is adapted to the capacity of the production means. For example, the size of the sectors may be defined as a function of the loading capacity of the ovens used for performing the heat treatments during densification, which ovens typically have a diameter of 1000 millimeters (mm). In addition, depending on the type of fabric used for the fiber reinforcement, it can be advantageous to subdivide the fiber preform into sectors of dimensions that are adapted to the shape of the fabric texture used. Furthermore, in the event of a problem (i.e. damage, impact, wear, . . . ) during fabrication or in-service use of the lobe structure, only the sector(s) involved need be changed.

Once made, the sectors are connected together via their ends so as to form a unit lobe structure 200 as shown in FIG. 7B. In an embodiment, the sectors may be assembled to one another by means of riveted connections. As shown in FIG. 7C, the ends 211 and 231 respectively of two adjacent sectors 210 and 230 are superposed, with each end 211 and 231 including a respective plurality of orifices 2110 and 2310, which co-operate with one another once the two ends are superposed. Thereafter, a rivet 240 is passed through each passage formed by two co-operating orifices 2110 and 2310, thereby holding the sectors together. Other fastener means (e.g. connection by bolts, brazing, . . . ) could naturally be used for assembling the sectors together.

The use of ceramic matrix composite material for the lobe structure of the mixer in accordance with invention makes it possible to reduce the weight of the nozzle in significant manner compared with a conventional nozzle fitted with a mixer that is made entirely of metal. The use of a lobe structure of ceramic matrix composite material instead of metal makes it possible to reduce the weight of the nozzle by 30% to 50%. In addition, ceramic matrix composite materials are known for their good mechanical properties and for their ability to conserve these properties at high temperature. Consequently, the lobe structure of the invention is made of a material that is particularly well adapted to withstanding the temperatures of the streams generated upstream in the turbomachine, and in particular the temperatures of the hot gas coming from the combustion chamber (primary stream).

Nevertheless, in order to increase the mechanical capacity and the stiffness of the lobe structure made of a ceramic matrix composite material, the structure also includes stiffener means. In an embodiment shown in FIG. 1, a stiffener ring 30 is secured to each of the inner lobes 22 of the structure 20, in the vicinity of the ends thereof. Thus, the lobe structure 20 presents increased mechanical strength against the loads generated by the flow of the streams coming from the turbojet.

More precisely, since each inner lobe end is secured to the ring, the lobe structure cannot be deformed by the flow of a stream, regardless of whether the stream is an inner stream or an outer stream. The ring 30 may be made of a metal or of a ceramic matrix composite material. In a variant of the invention, the exhaust cone of the engine can be used instead of the ring 30 to constitute means for stiffening the lobe structure. Under such circumstances, the inner lobes of the structure bear directly against the exhaust cone, which acts as a stiffener.

Figure 2:
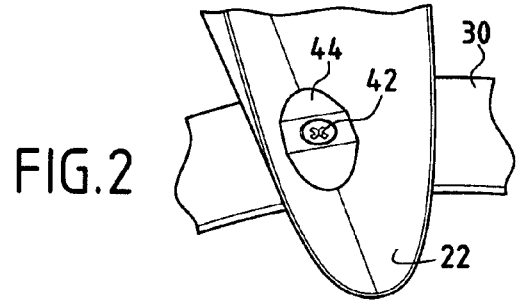
FIG. 2 is an enlarged view of a portion II of the FIG. 1 mixer.
Figure 3:
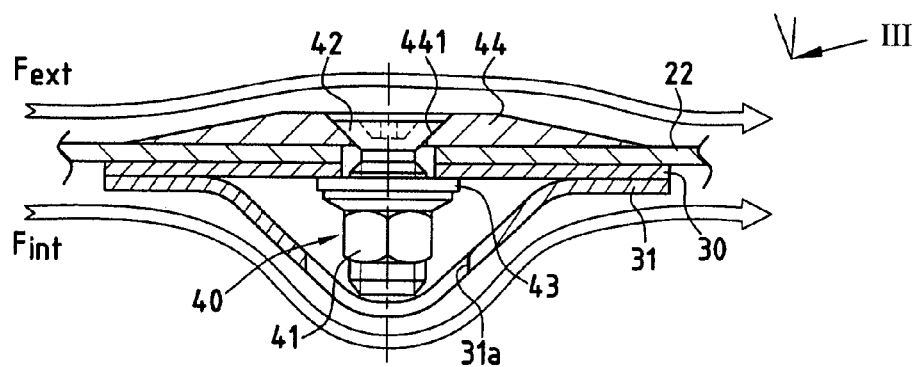
FIG. 3 is a section view on section plane III of FIG. 2.

Each inner lobe is fastened to the ring via a bolted connection 40. In order to guarantee that the ring withstands buckling loads well, and in order to limit aerodynamic losses, the bolted connections are integrated in streamlining elements. More precisely, and as shown in FIGS. 2 and 3, a spacer 44 is used over the top portion of the lobe, which spacer is streamlined so as to limit disturbances to the flow of the outer stream $F_{ext}$. The spacer 44 is countersunk at 441 for receiving the head of the screw 42 of the connection 40. As shown in FIG. 3, this prevents the screw 42 from projecting from the top portion of the lobe 22. Similarly, on the bottom side of the lobe 22 that rests on the ring 30, the bolted connection 40 is integrated in a streamlined fairing 31 fastened to the ring 30. The fairing 31 presents an aerodynamic shape in order to minimize the influence of the connection 40 on the flow of the inner stream $F_{int}$. The fairing 31 has an opening 31a for fastening a tightening screw around the nut 41 of the connection 40. The fairing contributes to giving the ring the ability to withstand buckling loads.

Figure 4:
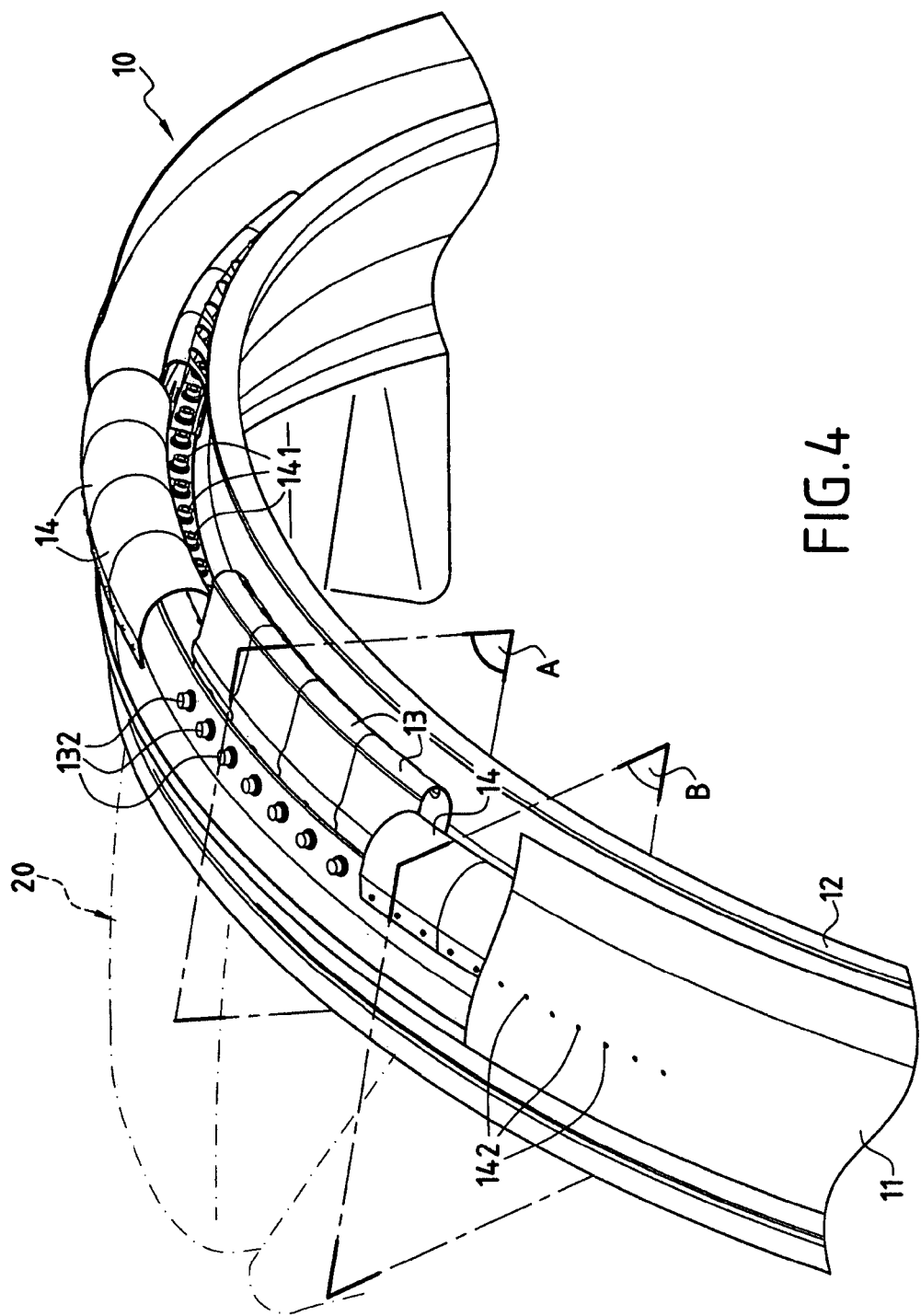
FIG. 4 is a face view looking along IV of FIG. 1.

Reference is now made to FIG. 4 which, in accordance with an embodiment of a mixer of the invention, shows the connection devices used for fastening firstly the lobe structure 20 to the fastener shroud 10, and secondly the outer cover 11 to the inner shroud 12.

One of the features of the ceramic matrix composite material with which the lobe structure 20 is constituted is that it presents a coefficient of thermal expansion that is low compared with the metal material from which the other parts of the mixer are made, such as in particular the inner shroud 12 to which the lobe structure 20 is attached. These parts are subjected to large temperature rises generated by the combustion gas from the engine. Thus, in order to compensate the differential expansion between the lobe structure made of ceramic matrix composite material and the inner shroud 12 made of metal material, use is made of flexible metal fastening tabs 13 to compensate for these expansion differences and to limit the mechanical load induced on the lobe structure. As shown in FIGS. 5A and 5B, the top portions of the tabs 13 include orifices 13c that co-operate with orifices 20a of the lobe structure to pass the bolted connections 132. The bottom portions of the tabs 13 include orifices 13b that co-operate with orifices 12a of the inner shroud 12, bolted connections 131 providing fastening between these two parts. The flexible tabs 13 also include openings 13a for passing keys for tightening the fasteners.

Similarly, to compensate for differential expansion between the outer cover 11 and the inner shroud 12 that receive respective different-temperature streams (the primary stream and the secondary stream), use is made of flexible metal fixing tabs 14 that are fastened firstly to the inner shroud 12 by bolted connections 141, and secondly to the outer cover 11 by rivets 142 (FIGS. 6A and 6B).

Thus, by the design of the mixer of the invention, it is possible to reduce the weight that is cantilevered out, thereby potentially limiting the mechanical load on the flange of the exhaust casing of the nozzle in the event of high loads being generated, e.g. as a result of losing a blade or in the event of an unbalance. By its reduced weight, the mixer of the invention also makes it possible to reduce the forces at the interfaces between the engine and its pylon.

What is claimed is:

1. A mixer for a separate-stream nozzle of a turbojet, the mixer comprising along a longitudinal axis both a fastener shroud for connecting said mixer to the exhaust casing of the nozzle, and a lobe structure for mixing the streams coming from the turbojet, said lobe structure presenting a succession of inner and outer lobes distributed circumferentially around the longitudinal axis of the mixer, the mixer being characterized in that the lobe structure is made of a ceramic matrix composite material and in that it further comprises means for forming stiffening connections between at least some of the inner lobes of said structure.

2. A mixer according to claim 1, characterized in that the lobe structure is made of a ceramic matrix composite material selected from the following composite materials: C/Sic; C/C—SiC; SiC/SiC; and oxide/oxide.

3. A mixer according to claim 2, characterized in that:
it includes a stiffener ring fastened in the vicinity of the ends of the inner lobes of the lobe structure;
the stiffener ring is made of metal material or of ceramic matrix composite material;
the stiffener ring is fastened to the inner lobes by bolted connections, the ring further comprising streamlining means for integrating each connection in such a manner as to limit aerodynamic losses and for providing the ring with strength against buckling loads;
the stiffener ring comprises respective streamlined fairings for integrating the portion of each bolted connection that projects inside the stiffener ring;
each bolted connection includes a streamlined spacer disposed on the inner lobes to integrate the portions of the bolted connections that project from the inner lobes;
the lobe structure is made of a single piece or of a plurality of assembled-together sectors;
the fastener shroud of the mixer is made of a metal material and in that the lobe structure is made of a ceramic matrix composite material and is attached to said fastener ring via flexible fastener tabs in such a manner as to compensate for differential expansion between the fastener ring and the lobe structure; and
the fastener shroud comprises an inner shroud mainly receiving the stream of hot gas coming from the combustion chamber of the turbojet, and an outer cover mainly receiving a bypass stream, said outer cover being attached into the inner shroud via flexible fastener tabs in order to compensate for differential expansion between those two parts.

4. A turbojet having a separate-stream nozzle, the turbojet being characterized in that the nozzle is fitted with a mixer according to claim 3.

5. A mixer according to claim 1, characterized in that it includes a stiffener ring fastened in the vicinity of the ends of the inner lobes of the lobe structure.

6. A mixer according to claim 5, characterized in that the stiffener ring is made of metal material or of ceramic matrix composite material.

7. A mixer according to claim 5, characterized in that the stiffener ring is fastened to the inner lobes by bolted connections, the ring further comprising streamlining means for integrating each connection in such a manner as to limit aerodynamic losses and for providing the ring with strength against buckling loads.

8. A mixer according to claim 7, characterized in that the stiffener ring comprises respective streamlined fairings for integrating the portion of each bolted connection that projects inside the stiffener ring.

9. A mixer according to claim 7, characterized in that each bolted connection includes a streamlined spacer disposed on the inner lobes to integrate the portions of the bolted connections that project from the inner lobes.

10. A mixer according to claim 1, characterized in that the lobe structure is made up of a plurality of assembled-together sectors.

11. A mixer according to claim 1, characterized in that the lobe structure is made as a single piece.

12. A mixer according to claim 1, characterized in that the fastener shroud of the mixer is made of a metal material and in that the lobe structure is made of a ceramic matrix composite material and is attached to said fastener ring via flexible fastener tabs in such a manner as to compensate for differential expansion between the fastener ring and the lobe structure.

13. A mixer according to claim 1, characterized in that the fastener shroud comprises an inner shroud mainly receiving the stream of hot gas coming from the combustion chamber of the turbojet, and an outer cover mainly receiving a bypass stream, said outer cover being attached into the inner shroud via flexible fastener tabs in order to compensate for differential expansion between those two parts.

14. A turbojet having a separate-stream nozzle, the turbojet being characterized in that the nozzle is fitted with a mixer according to claim 1.

\* \* \* \* \*